United States Patent [19]

Ono et al.

[11] Patent Number: 5,742,136
[45] Date of Patent: Apr. 21, 1998

[54] LINEAR MOTOR DRIVE SYSTEM

[75] Inventors: Yutaka Ono; Haruo Higuchi; Yutaka Koizumi; Shigeru Hashida, all of Tokyo, Japan

[73] Assignee: Yokogawa Electric Corporation, Tokyo, Japan

[21] Appl. No.: 523,990

[22] Filed: Sep. 5, 1995

[30] Foreign Application Priority Data

Sep. 20, 1994 [JP] Japan .................................. 6-224579
Jul. 12, 1995 [JP] Japan .................................. 7-175884

[51] Int. Cl.$^6$ .............................. H02K 41/00; H02P 8/00
[52] U.S. Cl. ...................................... 318/135; 310/12
[58] Field of Search ............................ 310/12, 13, 14; 318/135

[56] References Cited

U.S. PATENT DOCUMENTS

| | | | |
|---|---|---|---|
| 4,160,200 | 7/1979 | Imamura et al. | 318/616 |
| 5,283,434 | 2/1994 | Ishizuka et al. | 250/237 G |
| 5,355,070 | 10/1994 | Cocconi | 318/798 |
| 5,400,269 | 3/1995 | White et al. | 318/600 X |

Primary Examiner—Steven L. Stephan
Assistant Examiner—Judson H. Jones
Attorney, Agent, or Firm—Moonray Kojima

[57] ABSTRACT

A linear motor drive system which is substantially not influenced by deviations in shape of slits, uneveness of distribution of light, and high order high harmonic components of a sensor signal, and which comprises a linear optical encoder having high sensor accuracy and which enhances the position detecting resolution of the encoder without use of high frequency clock generator. The system comprises means for detecting the movement of the slider of the linear pulse motor by use of a linear optical encoder and means for feedback control of the motor based on the sensor signal, wherein a photodiode array is extended over a plurality of rows of slits on a scale plate; a diffuser is mounted between a light source and the scale plate, and n photodiodes are provided within one pitch of the slit, the width of one photodiode in the direction of the array is set at $p_0/(n+1)$, and the width of a gap between the photodiodes is set at $p_0 \cdot n(n+1)$. In another embodiment, a phase modulating encoder is provided and the position of the slider is found with an average value of several measured values of phase differences between the phase modulated signal outputted from the encoder and to which a dither signal is added and the reference signal whose phase is not modulated.

4 Claims, 12 Drawing Sheets

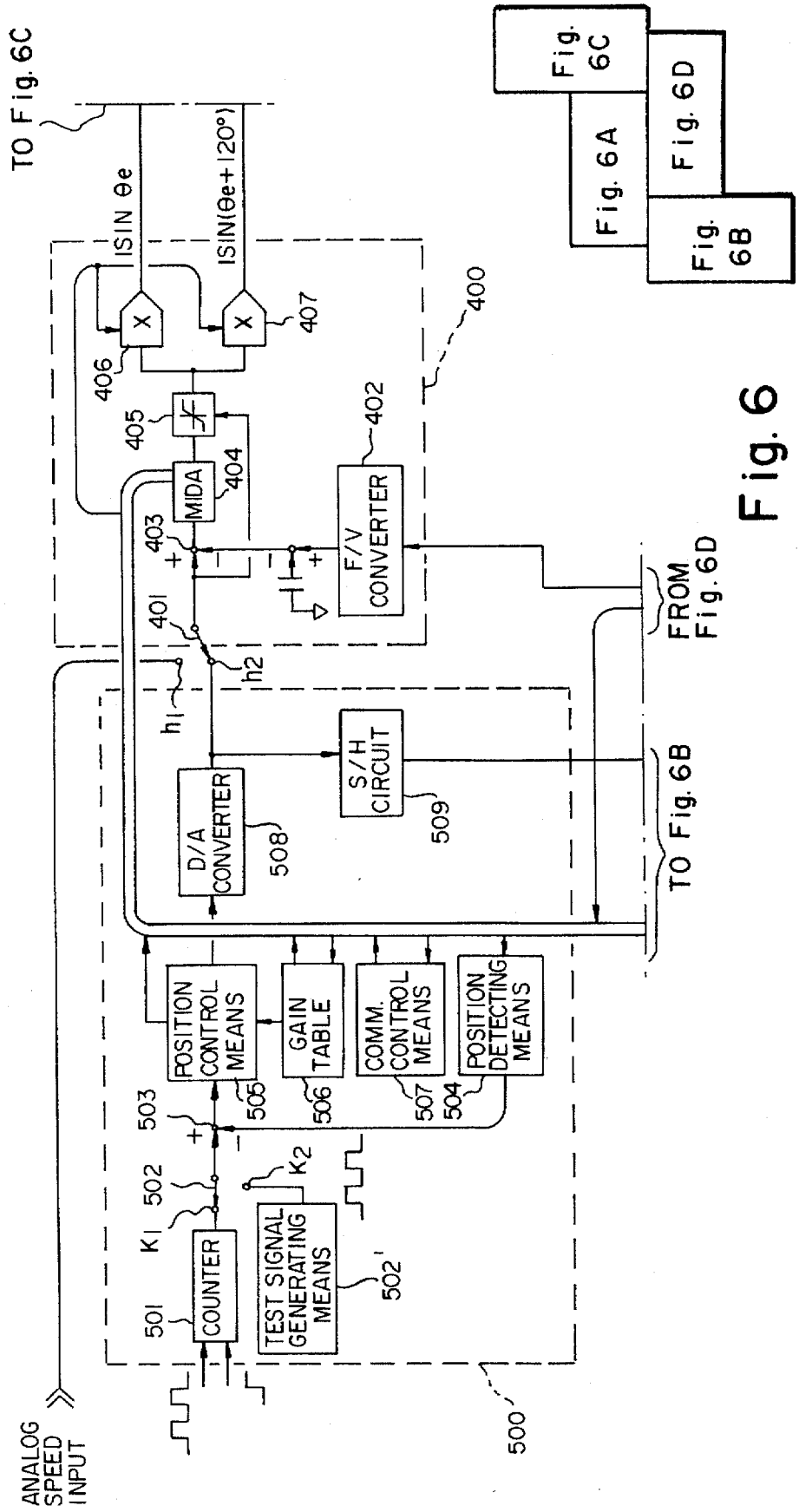

LINEAR MOTOR DRIVE SYSTEM

BACKGROUND OF THE INVENTION

1. Field of Invention

This invention relates to a linear motor drive system for feedback controlling a linear pulse motor.

2. Description of the Prior Art

In the prior art, there are various linear motor drive systems, all of which have one or more problems, disadvantages, and deficiencies. A number of pulse motors are used in the field of factory automation (often referred to as "FA") to drive industrial robots, work machines, and the like. For example, it is convenient to use a linear pulse motor for conveying semiconductor parts because the conveying operation is linear and the power transmission mechanism thereof can be simplified.

If the linear pulse motor used for such purpose is feedback controlled, high positioning accuracy is obtainable. A feedback control linear motor drive system is usually equipped with a sensor for detecting the movement of a slider of the linear pulse motor. A linear optical encoder is used as the sensor, for example. Slits provided on a coding plate of the linear optical encoder is created by means of an etching process or the like. However, the sensor accuracy decreases with variations in the shape of the slit due to nonconformity of etching, etc. The sensor accuracy also decreases when the distribution of light irradiated to the slits is not uniform. Furthermore, high order harmonics contained in the sensor signal may also cause errors.

Another sensor for detecting the position of the slider of the linear pulse motor comprises a phase modulating encoder which outputs a phase modulated signal whose phase is modulated with the movement of the slider.

The position of the slider is detected as follows. The phase difference between the phase modulated signal and the reference signal, whose phase is not modulated, is measured by a counter clock. This measurement is carried out each cycle comprising a certain period. The position of the slider is then detected by accumulating the variations of the measured phase differences.

A value smaller than one period of the counter clock is discarded and hence cannot be detected in measuring the phase difference. Accordingly, the resolution for detecting the phase difference is decided by the frequency of the counter clock. Although the position detecting resolution may be enhanced by enhancing the phase difference detecting resolution by increasing the frequency of the counter clock, it becomes necessary to have a high frequency clock generator which increases the cost of the circuit.

SUMMARY OF THE INVENTION

Accordingly, it is an object of the invention to overcome the aforementioned and other problems, disadvantages and deficiencies of the prior art.

Another object is to provide a linear motor drive system which is substantially not influenced by variations in the shape of the slits, the uneveness of distribution of light, and high order harmonic components of the sensor signal, and comprises a linear optical encoder having a high sensor accuracy and which permits enhancement of the position detecting resolution of the encoder without using a high frequency clock generator.

A further object is to provide a linear motor drive system for detecting the movement of the slider of the linear pulse motor by use of a linear optical encoder and Raving feedback control of the linear pulse motor based on a sensor signal, wherein the following improvements are incorporated therein. A photodiode array is extended over a plurality of rows of slits on a scale plate. A diffuser is disposed between a light source and the scale plate. "n" photodiodes are provided within one pitch of the slits, the width of one photodiode in the direction of the array is set at $p_0/(n+1)$ and the width of the gap between the photodiodes is set at $p_0/n(n+1)$.

Another object is to provide a linear motor drive system wherein a phase modulating encoder is used as an encoder and the position of the slider is found from an average value of several measured values of phase differences between a phase modulated signal outputted by the encoder to which a dither signal is added and a reference signal whose phase is not modulated.

DETAILED DESCRIPTION OF PREFERRED EMBODIMENTS.

Figure 1:
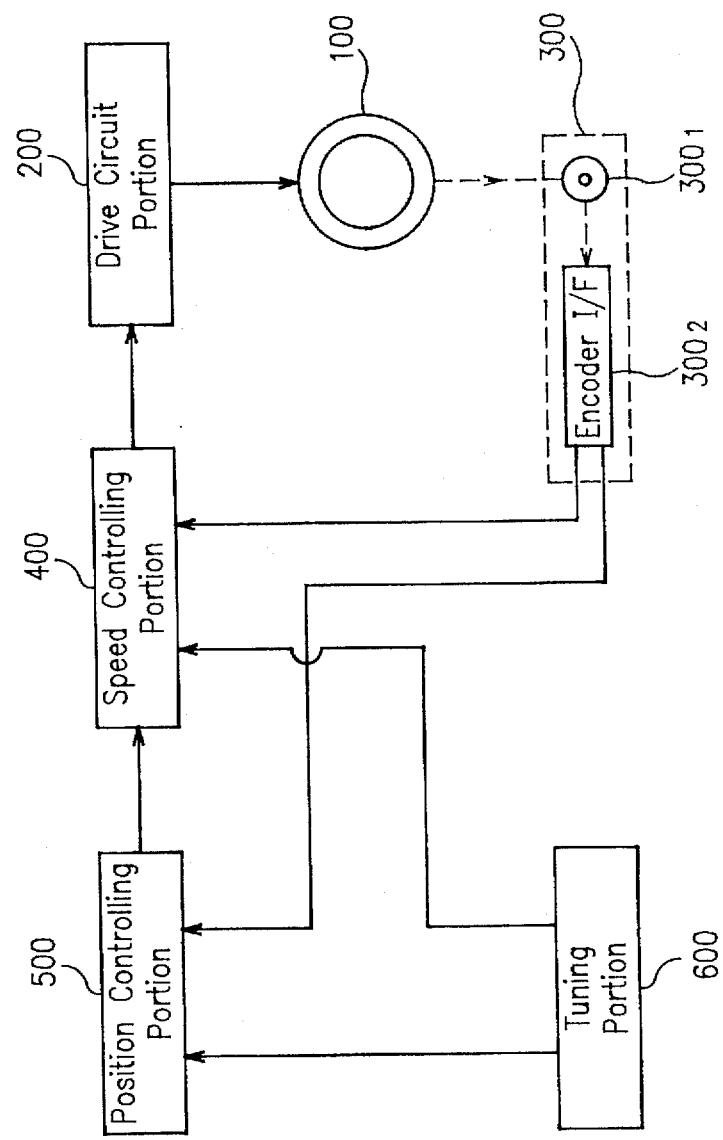
FIG. 1 is a schematic diagram depicting an illustrative embodiment of the invention.

FIG. 1 shows schematically an illustrative embodiment of the invention comprising a driving circuit 200 which drives a motor 100; an encoder section 300 comprising an encoder $300_1$ for detecting revolutions of the motor section 100, and an encoder interface $300_2$ (herein called encoder I/F) for outputting signals detected by encoder $300_1$; a speed control portion 400 which controls the number of revolutions of motor 100 by means of feedback control; a position control portion 500 which controls the rotational position of motor 100 by means of feedback control; and a tuning portion 600 which tunes the servo systems of the speed control portion 400 and position control portion 500.

The structure of each component of the system shown in FIG. 1 will now be described with reference to the other figures in the drawing described therewith.

MOTOR SECTION 100

Figure 2:
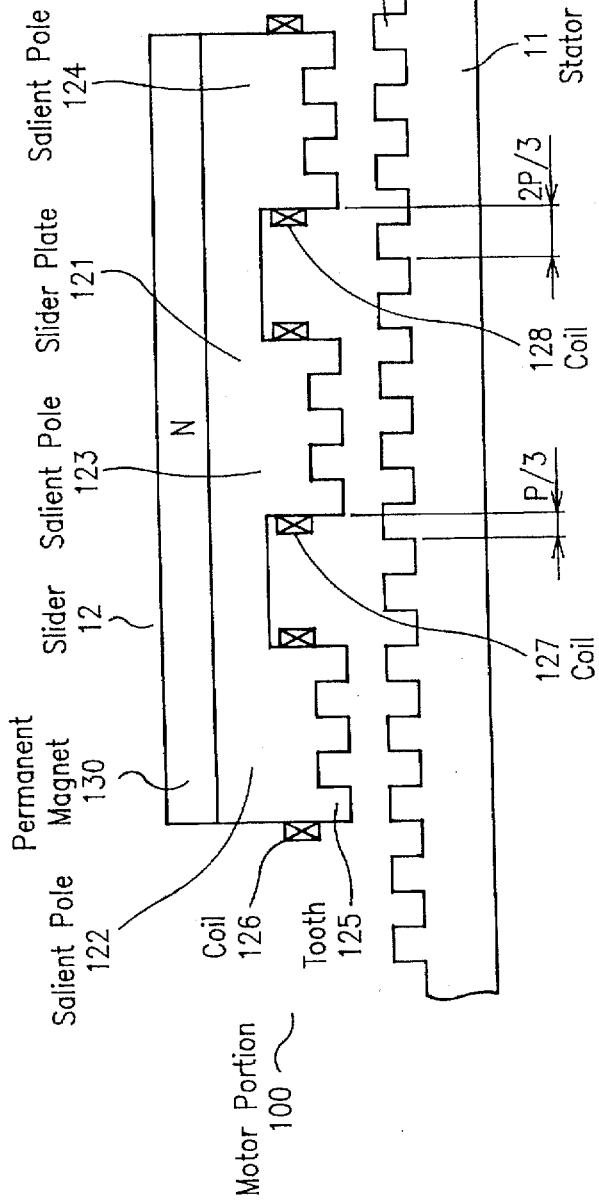
FIGS. 2(a) and 2(b) are front and side views depicting an example of the motor section of the embodiment of FIG. 1.
Figure 2:
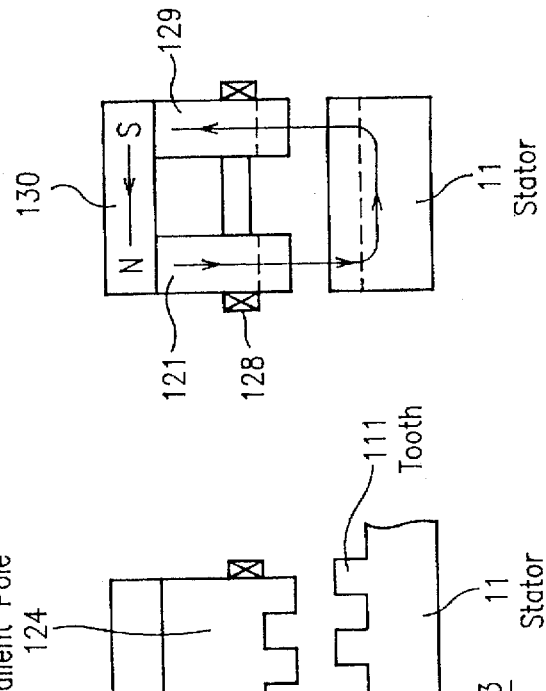

FIGS. 2(a) and 2(b) show an example of motor section 100 which is a linear pulse motor, which may be a three phase motor. Motor 100 comprises a stator 11 and a slider 12 and is a direct drive linear pulse motor wherein an object to be driven is attached directly to slider 12. Stator 11 is made of a magnetic material and has teeth 111 formed in the longitudinal direction at a constant pitch. In slider 12, a slider plate 121 is made of a magnetic material, and is provided with salient poles 122, 123, 124 and teeth 125, having the same pitch as teeth 111, formed at the ends of salient poles 122, 123,124. The phases of the teeth 125 formed at the ends of the salient poles 123 and 124 are shifted by p/3 and 2p/3, respectively, from the phase of the teeth formed at the end of salient pole 122 ("p" is the pitch of teeth 125). Three phase coils 126,127 and 128 are wound around the salient poles 122,123, and 124, respectively and are Y-connected and excited by AC signals whose phases differ by 120°.

As shown in FIG. 2(b), a slider plate 129 is constructed in the same manner as slider plate 121, and is disposed so that the phase of its teeth is shifted from the slider plate 121 by p/2. Note that coils 126,127, 128 are wound about the salient poles of slider plates 121 and 129.

A permanent magnet 130 connects slider plates 121 and 129 and provides bias flux thereto. Permanent magnet 130 is magnetized in the direction going from slider 121 to slider plate 129.

In motor 100, permanent magnet 130 applies bias flux to the stator and the salient pole portion of the sliders. This bias flux is enhanced by one of the slider plates 121 and 129 and is weakened by the other thereof by the flux of coils 126,127,128 and the slider 12 of motor 100 moves as the enhanced side and the weakened side are switched alternately.

ENCODER SECTION 300

Figure 3:
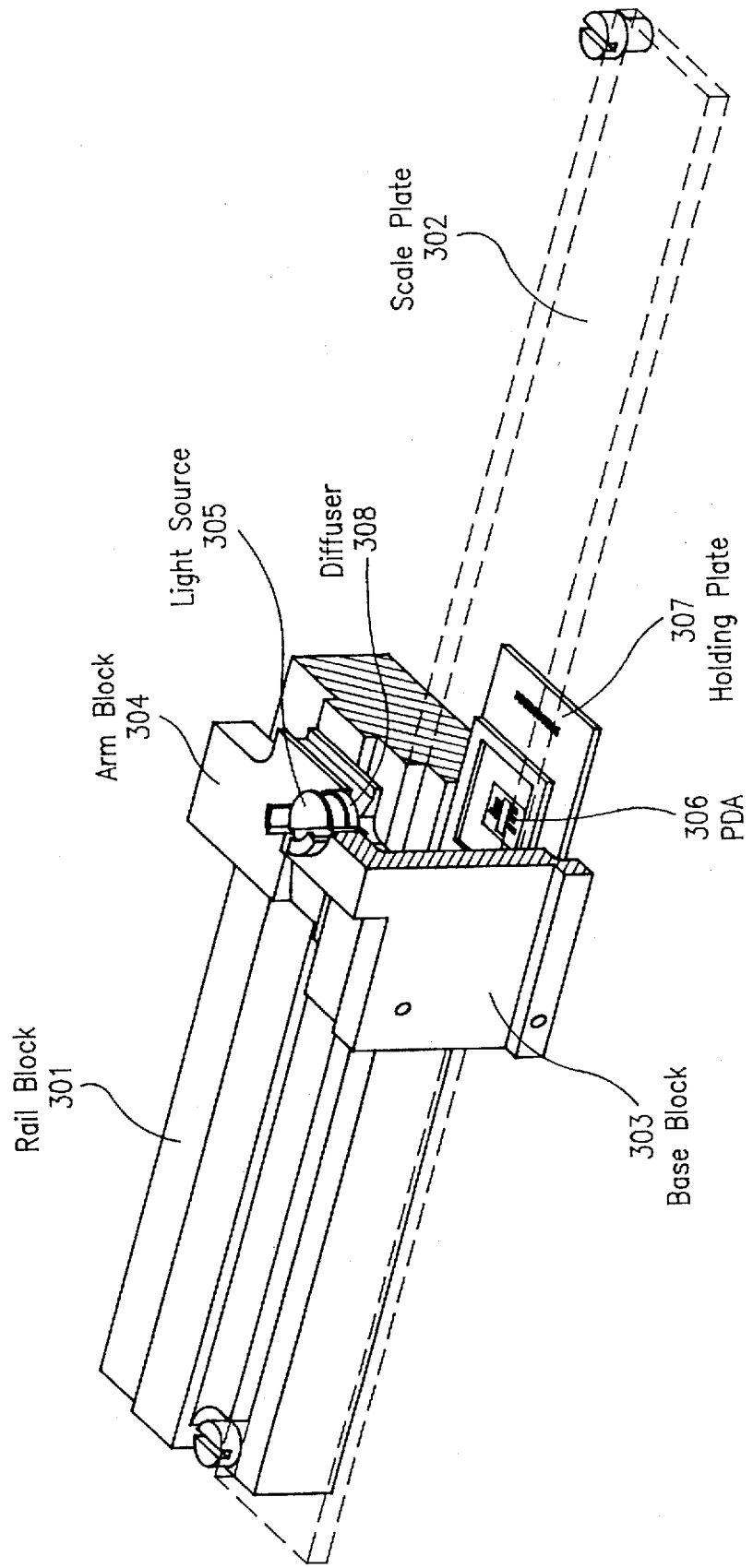
FIG. 3 is a perspective view depicting an exemplary structure of an encoder section of the embodiment of FIG. 1.

FIG. 3 shows an example of the encoder section 300 of the embodiment of FIG. 1, which may be a linear optical encoder, and which comprises a rail block 301 whose position is fixed, and a scale plate 302 fixed to rail block 301. The shape of scale plate 302 is shown by the broken line, and is provided with a plurality of rows of slits arrayed at the same pitch as that of teeth 111 of stator 11 in motor 100 along the longitudinal direction thereof.

A base block 303 is connected to slider 12 of motor 100 and moves together therewith. An arm block 304 is connected to base block 303. Rail block 301 guides the movement of base block 303 and arm block 304. A light source 305, which may comprise an LED, is mounted on arm block 304. A photodiode array (called "PDA") 306 is disposed so as to face light source 305 with scale plate 302 interposed therebetween. PDA 306 is fixed to base block 303 via a holding plate 307. A diffuser 308 is disposed between light source 305 and scale plate 302. Diffuser 308 evens out or smoothes out the distribution of light irradiated from light source 305.

Figure 4:
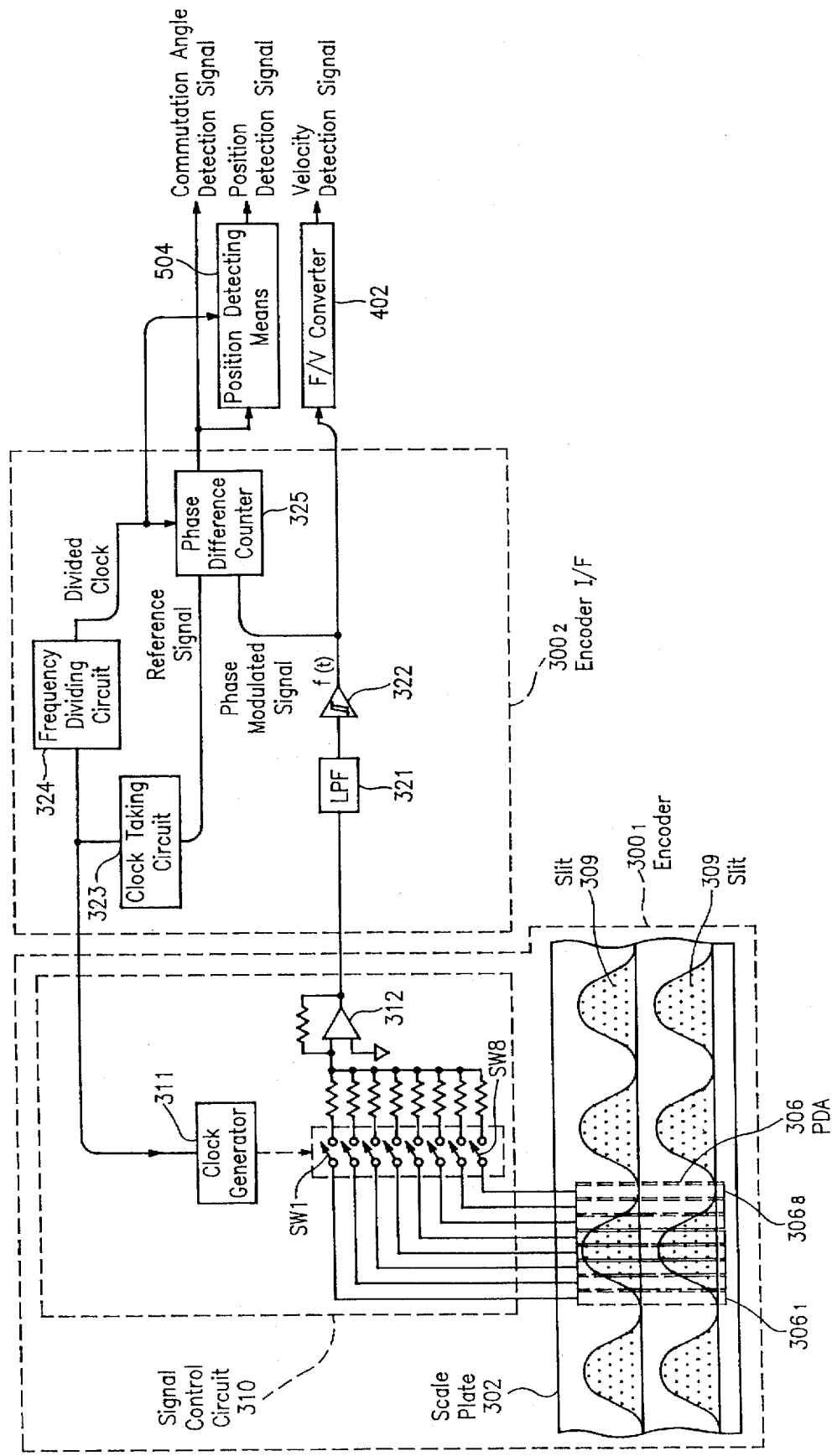
FIG. 4 is a diagram depicting an exemplary circuit of the encoder section of the embodiment of FIG. 1.

FIG. 4 shows an exemplary circuit of encoder section 300, wherein the same or corresponding parts as those in the previous figures of the drawing are designated with the same reference numerals. In FIG. 4, two rows of slits 309, having the shape of a sine wave, are formed along the longitudinal direction of scale plate 302 and at a constant pitch. Two rows of slits have the same phase. The pitch of slits 309 is equal to the pitch of teeth 111 of stator 11 in the linear pulse motor 100.

The dotted parts of FIG. 4 are slit portions. The direction of the array of slits 309 is the same as that of the array of teeth 111 of stator 11. The PDA 306 comprises eight photodiodes $306_1$–$306_8$ which are arrayed within one pitch of slit 309.

Each of the photodiodes $306_1$–$306_8$ are disposed along the two rows of slits. Light passing through the two rows of slits is detected by one photodiode. Thus, any deviation or error in the shape of the slits may be averaged and dispersion of detected deviation or error is reduced.

Figure 5:
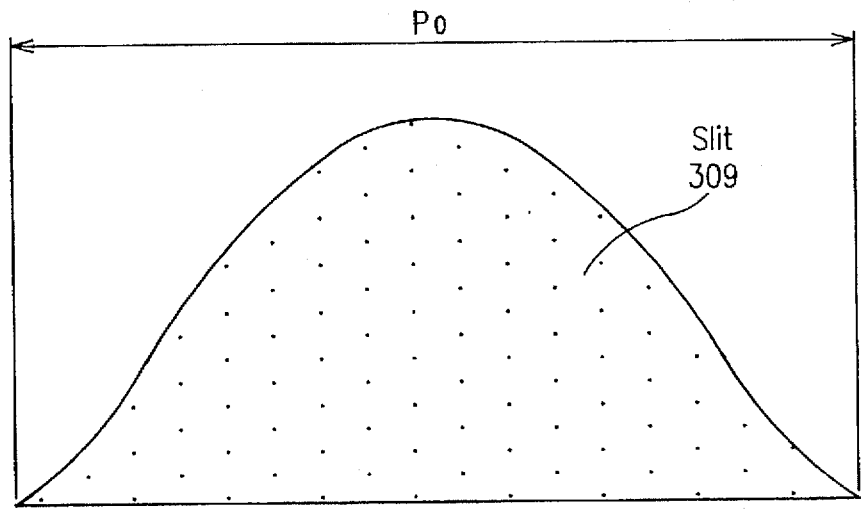
FIG. 5 is a diagram depicting the phase relationship between the slits and the photodiodes.

FIG. 5 shows the phase relationship between slits 309 and photodiodes $306_1$–$306_8$. FIG. 5 exemplifies the case of the phase relationship for removing ninth order high harmonics contained in the sensor signal. Eight photodiodes $306_1$–$306_8$ are arrayed within on pitch $P_0$ of slit 309. The width of one photodiode is $P_0/9$ and the width of a gap between photodiodes is $P_0/72$. This gap section is an insensitive zone.

Returning to FIG. 4, switches SW1–SW8 are provided in a signal processing circuit 310 and are closed sequentially with a constant timing by eight phase clocks provided by a clock generator 311, to scan the light sensor signals from photodiodes $306_1$–$306_8$. An operational amplifier 312 amplifies the signals supplied via each switch SW1–SW8. The output of operational amplifier 312 is a stepped wave whose height is proportional to the quantity of light which the diodes have received. The switches are opened and closed while shifting the switches to be closed by a factor of 4 each time.There is a closing of, for example, switches SW1, SW2, SW3 and SW4 at the first timing, and switches SW2, SW3, SW4, and SW5 at the second timing, etc.

In encoder I/F $300_2$, a low pass filter (called "LPF") 321 extracts low frequency components of the output from operational amplifier 312 and a comparator 322 shapes the waveform of the output from LPF 321.

A clock taking circuit 323 takes out any one phase of clock of an eight phase clock from clock generator 311, and a frequency dividing circuit 324 divides the eight phase clock from clock generator into ⅛. A phase difference counter 325 measures the phase difference between the phase modulated signal supplied from comparator 322 and the reference signal taken from clock taking circuit 323 and whose phase is not modulated, with the timing of the divided clock from frequency dividing circuit 324. The period of the divided clock corresponds to the scan period of the eight switches SW1–SW8.

Position detecting means 504 has an integration circuit and detects the position of the slider of the motor by accumulating the phase differences measured by the phase difference counter 325 for each scan period. An F/V (frequency to voltage) converter 402 detects the moving speed of the slider of the motor based on fluctuation frequency of the phase differences measured by the phase difference counter 325.

The encoder 300 operates as follows. Clock generator 311 opens and closes the switches SW1–SW8 with the timing of an eight phase clock to scan the light sensor signals from the photodiodes $306_1$–$306_8$. Because the photodiodes are an image sensor reflecting the images of the slits, the phase of the stepped wave signal obtained by the scanning changes by 360° when the PDA 306 and the light source 305 move by one pitch. Accordingly, the signal obtained by passing the stepped wave signal through LPF 321 and comparator 322 becomes a phase modulated signal given by the following equation:

$$f(t) = A \sin[\omega t + 2\pi(x/p_0)] \quad (1)$$

wherein A is a constant, t is time, x is the relative movement amount, $\omega = 2\pi f_s$, and $f_s$ is the frequency of the eight phase clock of clock generator 311. The phase of the reference signal taken out by the clock taking circuit 323 is $\omega t$.

Because one scan period ends when switches SW1–SW8 are switched 8 times, the period of the divided clock of the frequency dividing circuit 324 becomes the scan period.

Phase difference counter 325 measures the phase difference between the phase modulated signal, supplied from comparator 322, and the reference signal, supplied from the clock taking circuit 323, for each scan period, with the timing of the divided clock. This phase difference is $2\pi(x/p_0)$, as shown by equation (1).

Because of the following equation, the phase difference measured by phase difference counter 325 becomes the very phase shift between the teeth of the stator and the teeth of the slider of the motor. The communication of the motor is controlled based on this phase shift. That is, phase difference counter 325 directly detects signals used for the communication control. The phase difference, measured by phase difference counter 325, is sent as it is to communication control means 507, to be described later, as a communication angle detection signal.

Position detecting means 504 accumulates variations of the phase differences measured by phase difference counter 325 with the timing of the divided clock from frequency dividing circuit 324. This accumulated value becomes the position of the slider of the motor. Accordingly, the accumulated value of the position detecting means 504 becomes a feedback signal, which is used for the feedback control of the position of the motor.

The F/V converter 402 outputs a voltage signal which is proportional to the fluctuation frequency of the output of the comparator 322. This signal becomes a feedback signal, which is used for the feedback control of the speed of the motor. Thus, the signals used for the communication control, the position control, and the speed control are detected simultaneously.

Next, the method is described with reference to FIG. 5, for removing the ninth order high harmonics contained in the sensor signal.

As described, the basic wave of the sensor signal is given by above equation (1). The ninth order high harmonics in the sensor signal is expressed as follows:

$$f_9(t) = A_9 \sin[\omega t + 2\pi(9x/p_0)]$$

wherein $A_9$ is a constant.

Because the width of one photodiode is $P_0/9$ and the phase of each photodiode is shifted by $P_0/8$ each time, the signal component of the sensor signal of the nth (n=1, 2, ...) photodiode is expressed as follows:

$$I = K \int_{np0/8}^{(np0/8)+(p0/9)} f(t) dx$$

Meanwhile, the ninth high harmonic in the sensor signal of the nth photodiode is expressed as follows:

$$I_9 = K \int_{np0/8}^{(np0/8)+(p0/9)} f_9(t) dx$$
$$= K \int_{np0/8}^{(np0/8)+(p0/9)} A_9 \sin[\omega t + 2\pi(9x/p_0)] dx$$
$$= 0$$

Hence, the ninth high harmonic is cancelled.

Figure 6B:
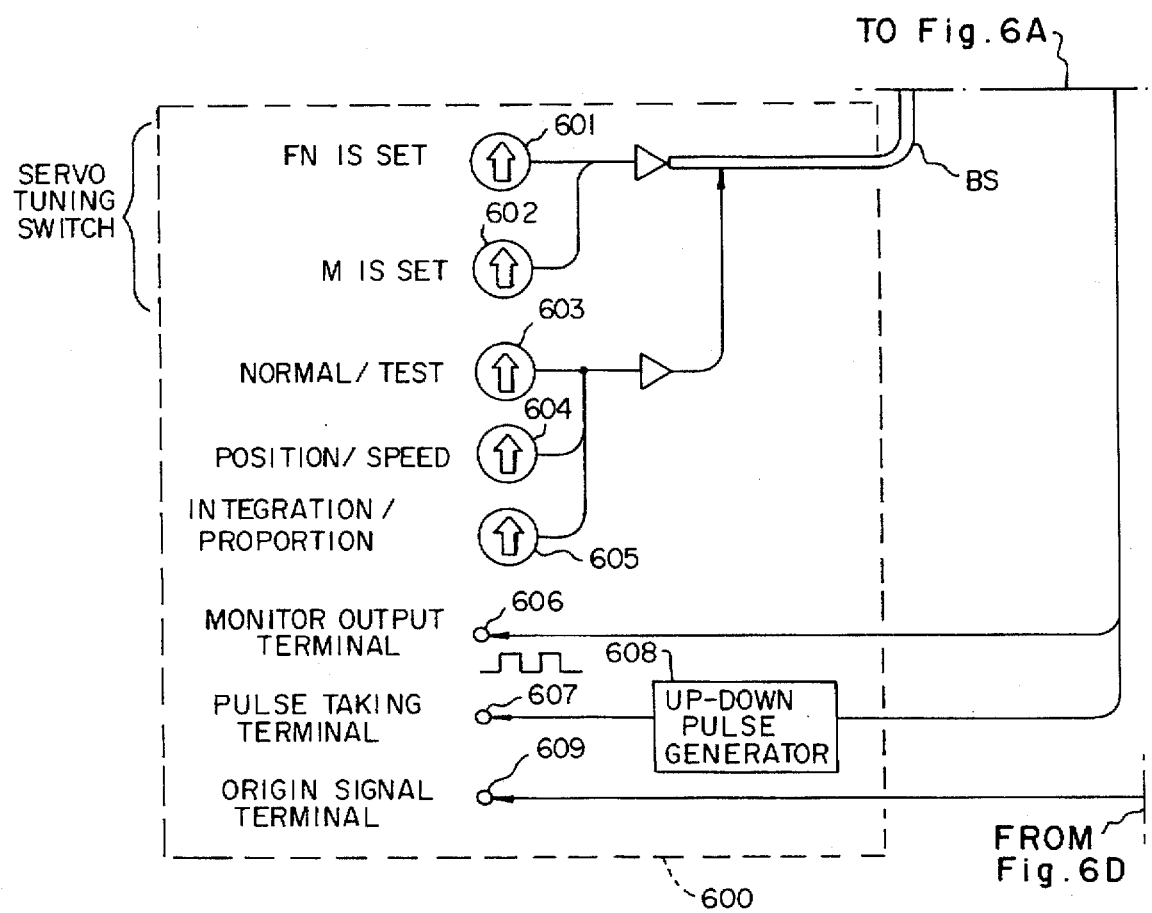
FIG. 6 is a diagram depicting details of the embodiment of FIG. 1.
Figure 6C:
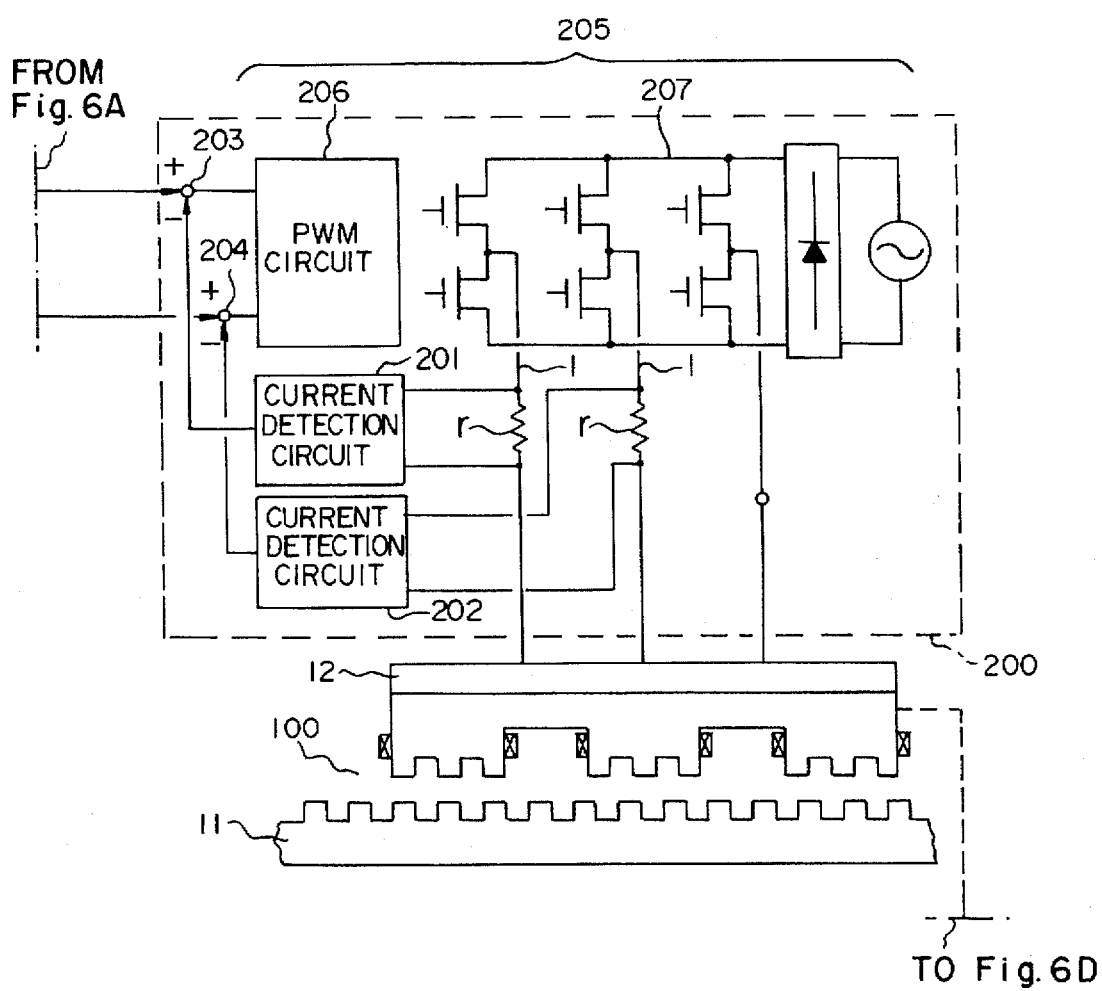
Figure 6D:
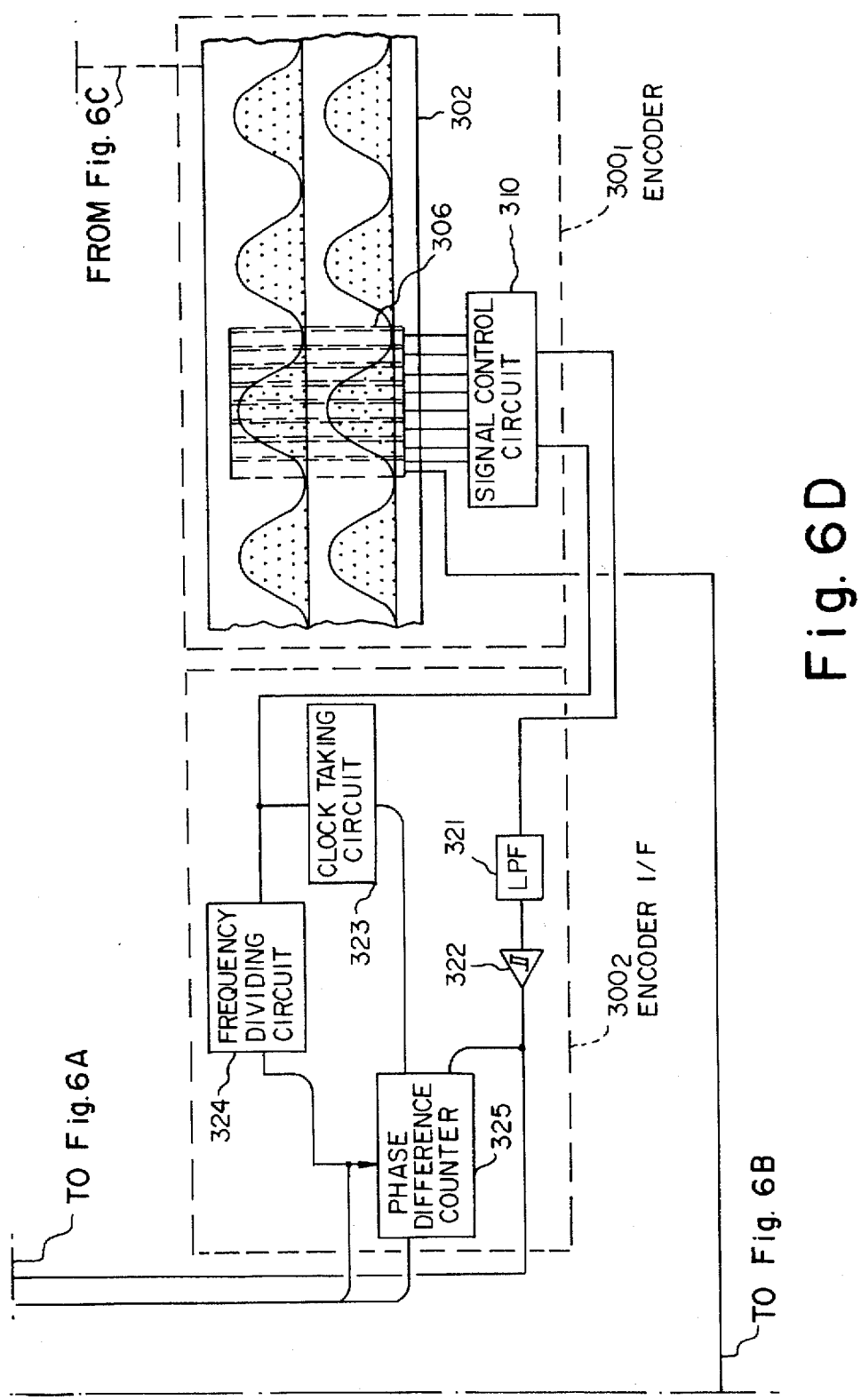

FIG. 6 shows details of the embodiment of FIG. 1 so that those components already described will not be described again.

DRIVE CIRCUIT PORTION 200

As shown in FIG. 6, driving circuit portion 200 comprises current detecting circuits 201,202 which detect exciting currents flowing through two phase coils, among three phase coils of motor 100; and subtractors 202,204 which calculate the difference between the current command value from speed control portion 400 and currents detected by current detecting circuits 201 and 202. A current amplifying circuit 205 provides a three phase sinusoidal current to the motor so that the difference current of subtractors 202,204 becomes zero by turning ON and OFF transistors of exciting circuit 207, by means of a PWM signal generated by PWM circuit 206 based on signals from subtractors 203,204.

SPEED CONTROLLING PORTION 400

As shown in FIG. 6, speed control portion 400 comprises a switch 401 which switches between speed control and position control. When speed control is to be performed, switch 401 is connected to contact $h_1$ and when position control is desired to be performed, switch 401 is connected to contact $h_2$. An F/V converter 402 converts the output signal from encoder I/F $300_2$ into a speed signal. A subtractor 403 calculates the difference between the signal from switch 401 (e.g. it becomes a speed command value) and a signal from F/V converter 402.

Furthermore, a multiplying digital to analog converter (called "MDA") 404 changes the gain of the digital signal and amplifies the analog input signal. A signal for setting the gain is supplied from position control portion 500 or from tuning portion 600.

A voltage control limiter (called "VCL') 405 suppresses the output from MDA 404 to a certain upper limit value or a certain lower limit value. MDA 406 and MDA 407 receive a signal from VCL 405 and supply a current signal I $\sin\Theta_e$ or I $\sin(\Theta_e+120°)$ to subtractors 203 and 204 as a current command value following the communication control signal from the position control portion 500.

POSITION CONTROLLING PORTION 500

As shown in FIG. 6, position control portion 500 comprises a counter 501 which generates a position command signal based on the position command pulse signal and the rotational direction signal. Switch 502 is connected to contact $k_1$ during a normal mode, and to contact $k_2$ during a test mode when a test signal is supplied from test signal generating means 502.

A subtractor 503 calculates the difference between the signal from switch 502 (e.g. it becomes a position command signal ) and the signal from position detecting means 504. Position detecting means 504 has already been described above.

Position control means 505 tunes the gain of MDA 404, based on the parameter read out of gain table 506 by the signal from encoder I/F 3002 or tuning portion 600. Position control means 505 constitutes a tertiary servo system performing I-PD (i.e. integrating, proportioning, and differentiating) operations by use of appropriate software.

Figure 7:
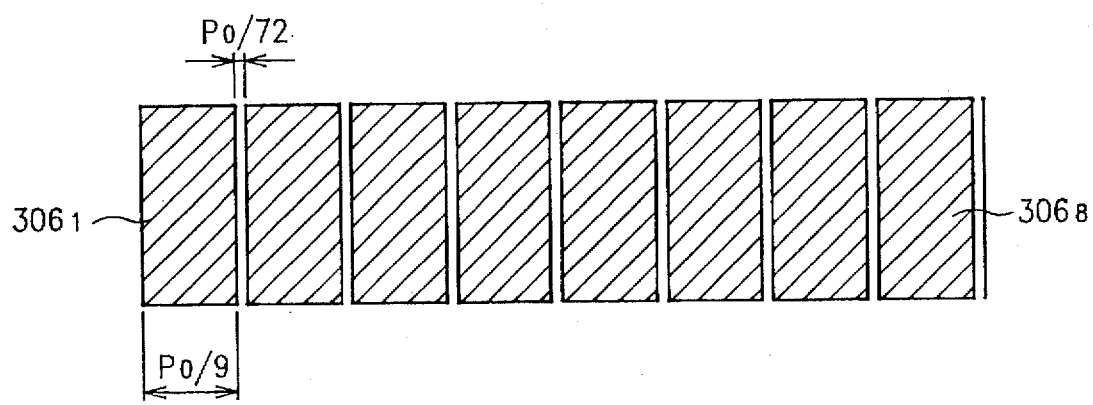
FIG. 7 is a table depicting one example of a gain table stored in the position control section.

Gain table 506 is a table showing load weights M of the motor, natural frequencies $f_n$ of the position control system and optimum control values $x_{11}$, $x_{12}$, $x_{13}$ and the like, corresponding to the values, as shown in FIG. 7, for example. There are two types of gain tables 506; such as first gain tables for controlling speed, and then gain tables for controlling position. There are also two types of tables for controlling speed and for controlling position. Also there are tables for the P and I operations (proportioning and integrating operations).

Communication control means 507 controls the communication of the motor by sending a signal to multipliers 406 and 407, based on the signal from I/F $300_2$. A digital to analog (D/A) converter 508 converts the output from position control means 505 from digital to analog. A sample and hold circuit (called"S/H circuit") 509 samples and holds the output from D/A 508 and sends the held signal to tuning portion 600.

When speed is to be controlled, switch 401 is connected to contact $h_1$ to calculate the difference between an analog speed input, as a speed command value, and a speed signal from F/v converter 402 by use of subtractor 403. The gain of MDA 404 is set by a control parameter value read out from gain table 506 by switches 601 and 602, to be described later.

When position is to be controlled, switch 401 is connected to contact $h_2$ and switch 502 is connected to contact $k_1$. Then, the difference between the position command signal and the output signal from position detecting means 504 is calculated by subtractor 503. Position control means 505 reads the control parameter from the gain table 506 via switches 601 and 602 and tunes the gain of the MDA 404 based on the position control algorithm using this control parameter.

TUNING PORTION 600

As shown in FIG. 6, tuning portion 600 comprises servo tuning switches 601, 602, wherein natural frequency setting switch 601 sets the natural frequency $f_n$ at a plurality of steps within a predetermined range. For example, the natural frequency is set at 16steps within a range of 5 to 20 Hz by switch 601. The load weight setting switch 602 sets the load weight M at a plurality of steps within a predetermined range. When $f_n$ and M are set by switches 601 and 602, the optimum control parameter value which correspond to the set values are read out of gain table 506.

When position control is to be performed using switches 601 and 602, position control means 505 tunes the gain of MDA 404 based on the control parameter values read out from the tabel for position control. When speed control is to be performed, the control parameter read out from the table for speed control is sent to MDA 404 to tune the gain.

A switch 603 is provided for switching switch 502. A switch 604 is provided for switching the switch 401. A switch 605 is provided for switching the speed control and the position control to the integrating or proportioning operation. The tables for the integrating operation and for the proportioning operation are suitably applied by switching switch 605. When, for example, a robot arm is to be moved using a DD motor, the control by means of the integrating operation is performed by positioning the robot arm and control by means of the proportioning operation (called "compliance control") is performed by grasping an item by use of the robot arm.

A monitor output terminl 606 takes out an output from position control portion 500 via an S/H circuit 402. This output is sent to a display unit (e.g. an oscilloscope) to be monitored.

A pulse taking terminal 607 is a terminal for taking out an incremental pulse signal via an up-down pulse generator 608. An origin signal terminal 609 is used to take out outputs from photodiodes $G_1$ and $G_2$. The outputs from the terminals 607 and 609 are sent to a controller, not shown. The controller detects the rotational position of the motor from the output from pulse taking terminal 607 and detects the origin position from the output from origin signal terminal 609.

A data bus BS transmits signals from encoder section 300, speed control portion 400, position control portion 500 and tuning portion 600.

If the load weight M of the motor is not Known, switch 502 is connected to contact $k_2$, a known test signal is applied to position control means 505 and a signal outputted by position control portion 500 is monitored by using a motor output terminal. Then, a set value of load weight M is regulated by load weight setting switch 602 so as to eliminate distortions in the monitored waveform. Note that $f_n$ and M may be set by means of an outside controller, instead of switch 502.

Although the case has been described wherein the control parameter is read out from gain table 506 when natural frequency $f_n$ and load weight M are both set by the servo tuning switch, the invention should not be considered to be limited thereto. It is possible to provide an embodiment wherein the control parameter is read out when either $f_n$ or W is set. Moreover, although the case has been described wherein two rows of slits are formed, the invention is not limited thereto. It is possible to construct an embodiment so that more than three rows of slits are formed and photodiodes are disposed along the slits of each row. Furthermore, although the slit has been described to have the shape of a sine wave, it may also be rectangular or other shapes.

Also, the case has been described of removing the nth order high harmonics from the sensor signal; such can be more generalized. For example, it is possible to provide an embodiment wherein the (N+1) order high harmonics is removed from the sensor signals, by setting the number of photodiodes provided within one pitch of the slit as n (wherein n is an integer) and the width of one photodiode in the direction of the array be set as $p_0/(n+1)$ and the width of the gap between the photodiodes be set as $P_0/n(n+1)$, with $P_0$=pitch.

The foregoing illustrative embodiment, attains the following and other effects and advantages. First, because a plurality of rows of slits are formed and each photodiode is disposed so as to be located along the plurality of rows of slits, light passing through the plurality of rows of slits is detected by one photodiode. Thus, deviations or errors in the shape of the slits caused, for example, by non-uniformity of etching or the like, may be averaged, thereby allowing for dispersion of detection errors. Second, because the diffuser is disposed between the light source and the scale plate, the distribution of light from the light source is evened out or smoothed out. Hence, the detection error caused otherwise by the uneveness of distribution of light is substantially reduced. Third, because "n" photodiodes are arrayed within one pitch of the slit, the width of one photodiode is set at $p_0/(n+1)$ and the width of the gap between the photodiodes is set at $p_0/n(n+1)$, the (n+1) order high harmonic contained in the detection signal is effectively removed. Thus, the detection accuracy is substantially improved.

ANOTHER ILLUSTRATIVE EMBODIMENT

Figure 8:
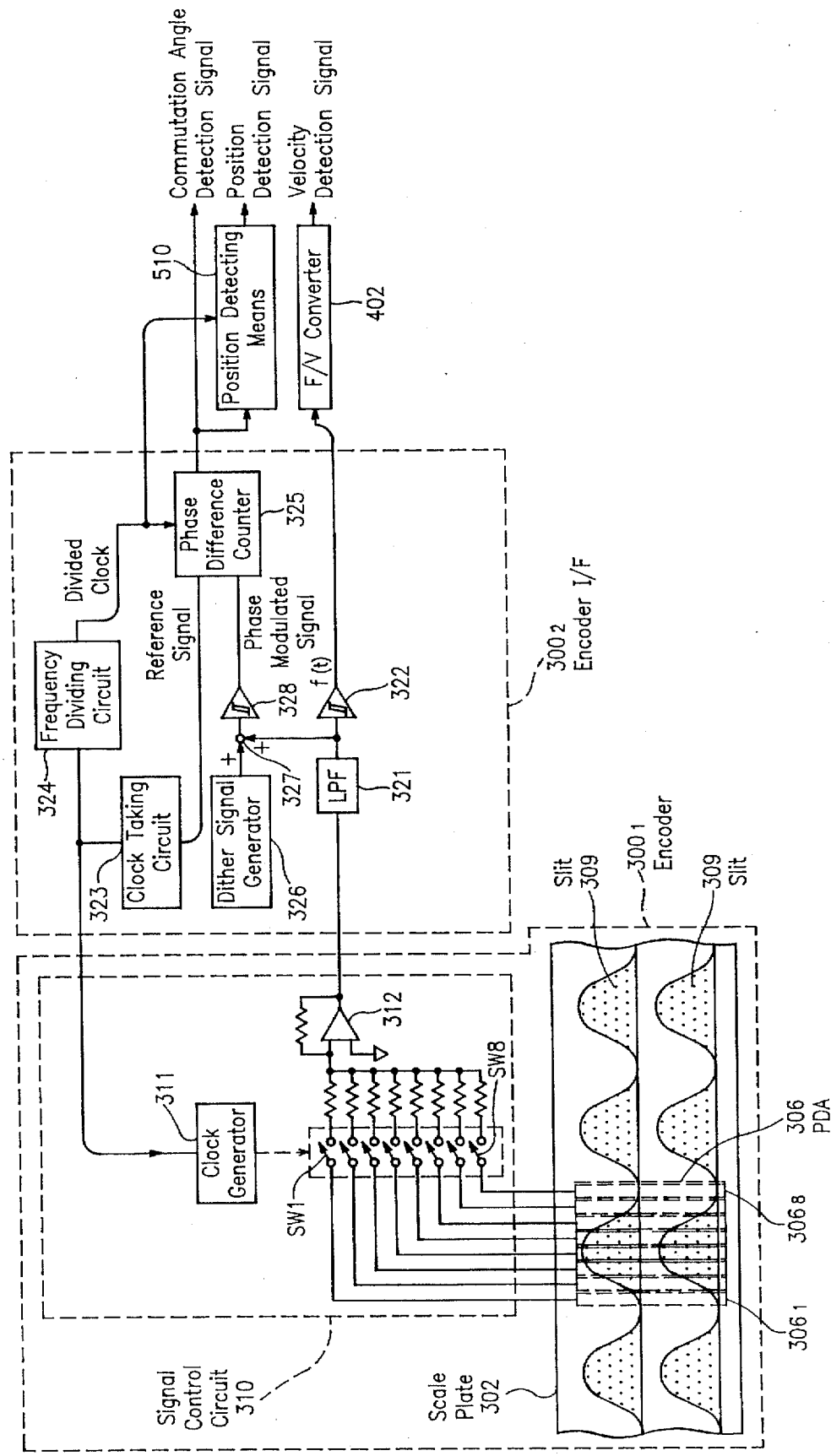
FIG. 8 is a diagram depicting the main parts of another illustrative embodiment of the invention.

FIG. 8 shows the main parts of another illustrative embodiment. Parts of the embodiment not shown in FIG. 8 are constructed in the same manner as the embodiment of FIG.6. The embodiment of FIG. 8 utilizes a dither signal generating means 326 to generate a dither signal. The period of the dither signal is n (wherein n is an integer of more than 2) times the period of the phase modulated signal and its amplitude is at the level of fluctuating the phase of the phase modulated signal within a range of about the detecting resolution of the phase difference counter. The frequency of the dither signal is in a band sufficiently higher than the band in which the motor position control servo system responds.

Adder means 327 adds the dither signal, generated by dither signal gerating means 326, to the output from LPF 321 and comparator 328 shapes the adder signal from adder means 327 and supplies the compared signal to phase difference counter 325.

Position detecting means 510 finds the average value of n measured values, measured by the phase difference counter 325, across n measurement cycles when the slider is positioned and finds the position of the slider from the found average value. Position detecting means 510 is provided in the embodiment of FIG. 8 in place of the position detecting means 504 of the embodiment of FIG. 6.

Figure 9:
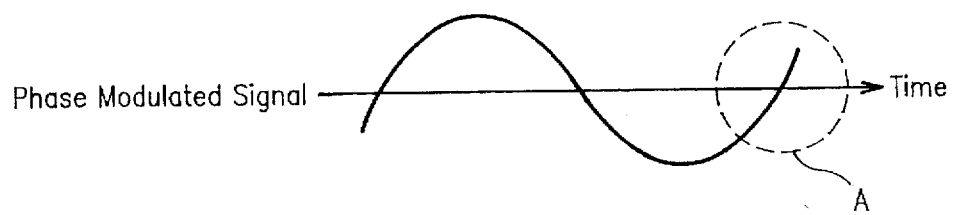
FIG. 9 is a diagram useful for explaining operation of the embodiment of FIG. 8.
Figure 10:
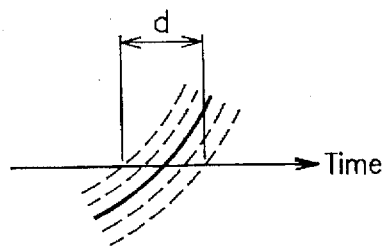
FIG. 10 is a diagram useful for explaining the operation of the embodiment of FIG. 8.

Operation of the FIG. 8 embodiment will be described with reference to FIGS. 9–12. The phase modulated signal fluctuates when the dither signal is added to the phase modulated signal. When the dither signal is added to the phase modulated signal, as shown in FIG. 9, for example, the phase modulated signal at A fluctuates as shown by the broken lines in FIG. 10. That is, a zero crossing position of the phase modulated signal fluctuates. This fluctuation ranges about the detecting resolution of the phase difference counter 325. The detecting resolution of the phase difference counter 325 is denoted as (d) in FIG. 10. The dither signal is not added to the reference signal. Accordingly, the phase difference between the phase modulated signal and the reference signal fluctuates by an amount of the dither signal.

The count $\phi(t)$ of the phase difference counter 325 is sampled once each period T of the divided clock of the frequency dividing circuit 324. Accordingly, the time series data of counter $\phi(t)$ is represented as $\phi(k)$ assuming that $t=kT$ (wherein $k=0,1,2,3\ldots$). Note that $\phi(k)<2\pi$.

In the prior art position detecting apparatus, a detected position x(t) is represented by the following:

$$x(t)=C\cdot\phi(k) \qquad (2)$$

wherein C is the detectng resolution [m/digit] of the phase difference counter 325, and [m] is the dimension of x(t), and [digit] is the dimension of $\phi(k)$. The detecting resolution C is equivalent to the period of the counter clock of the phase difference counter 325.

On the other hand, in the position detecting apparatus of the invention, a detected position x(t) is represented by the following:

$$x(t) = \sum_{i=0}^{n-1} C\cdot\phi(k-1)/n \qquad (3)$$

While the detected position x(t) is found in the minimum unit of C in expression (2), it is found in the minimum unit of C/n in expression (3). Accordingly, this means that the detecting resolution of the position detecting apparatus of the invention is enhanced by n times, as compared to the prior art apparatus. Note that the motor is positioned when the detected position x(t) is found in the invention.

Figure 11:
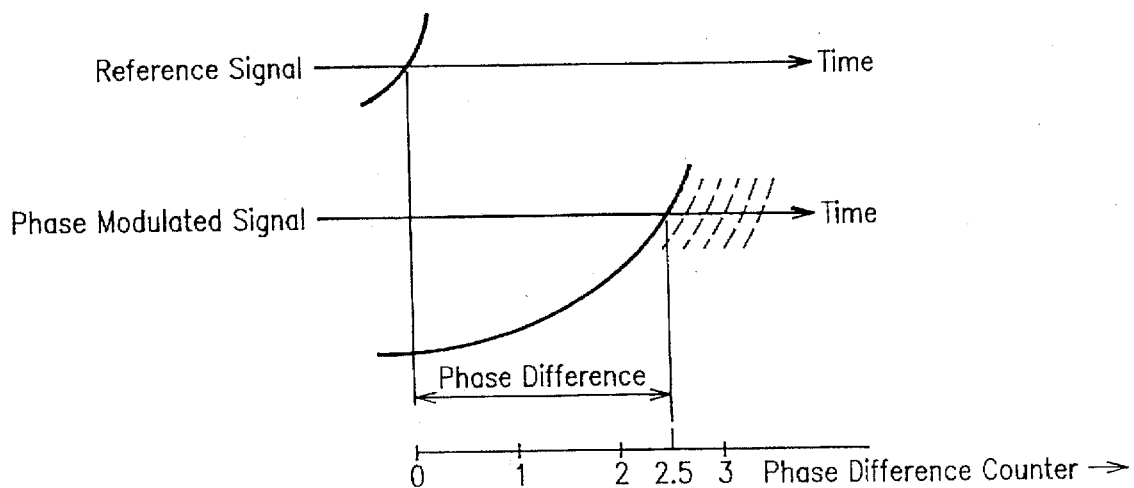
FIG. 11 is a diagram useful for explaining the operation of the embodiment of FIG. 8.

The method of detecting the position will now be explained using an example of when n=5. When the true value of the phase difference between the reference signal and the position detection signal is 2.5, as shown in FIG. 11, for example, in the state wherein the motor is positioned, it is counted as 2 because phase difference counter 325 cannot detect a number below a decimal point. Accordingly, the position is detected from count 2 in the prior art.

Figure 12:
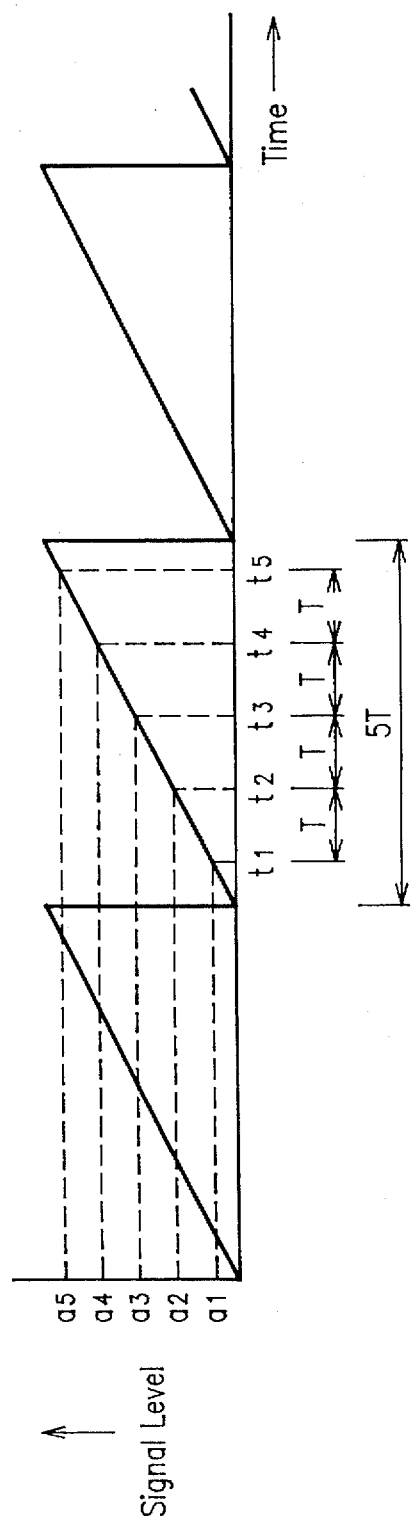
FIG. 12 is a diagram useful for explaining the operation of the embodiment of FIG. 8.

On the other hand, the dither signal shown in FIG. 12 is added to the phase modulated signal from n=5 in the invention. The period of the dither signal shown in FIG. 12 is 5T. signal levels $a_1$, $a_2$, $a_3$, $a_4$ and $a_5$ at times $t_1$, $t_2$, $t_3$, $t_4$ and $t_5$ taken for each period T are signal levels which cause the phase of the phase modulated signal to fluctuate by 0.1, 0.3, 0.5, 0.7, and 0.9 times the detecting resolution of the phase difference counter, respectively. By adding such dither signal to the phase modulated signal, the dither signals, whose levels differ for each period of the divided clock, are added to the phase modulated signal extending for five periods in total. Thus, the phase differences become 2.6, 2.8, 3.0, 3.1 and 3.3. Accordingly, phase difference counter 325 counts 2, 2, 3,3, and 3. When the five counts are averaged, the phase difference turns out to be 2.6. Because the phase difference is found with a resolution of 0.2 in the invention, the detecting resolution is enhanced by five times, as compared with the prior art wherein the phase difference is found to have a resolution of only 1.

Note that the dither signals which fluctuate the phase difference of the phase modulated signals by 0, 0.2, 0.4, 0.6, 0.8, 0.1, 0.3, 0.5, 0.7 and 0.9 times the detecting resolution of the phase difference counter may be added to the phase modulated signal. Such dither signals may be generated by provided a delay circuit.

In this case, the phase difference counter counts as 3, 3, 3, 4, 4, 3, 3, 4, 4, and 4. When n=5, 3.4 and 3.6 of the phase differences are found alternately. Because the detected position x(t) found from the phase difference is fed back to the position control system as a feedback signal, positioning is made near 3.5 of the phase difference. Because the frequency of the dither signal is in the band sufficiently higher than the band in which the motor position control servo system responds, the position of the motor will not fluctuate due to the phase differences 3.4 and 3.6 found alternately.

Thus, the phase difference may be detected with a higher detecting resolution than that of the phase difference counter by adding the dither signal to the phase modulated signal according to the embodiment of FIG. 8. That is, according to the invention, the dither signal is added to the phase modulated signal to fluctuate the phase of the phase modulated signal within a range of about the detecting resolution of the phase difference counter. Then, the phase difference is found by averaging the phase differences measured when the phase difference has been fluctuated. Thus, the phase difference may be detected substantially with a resolution of less than a decimal point of the phase difference counter. Accordingly, the position detecting resolution is enhanced without enhancing the detecting resolution of the phase difference counter. Moreover, the position detecting resolution of the encoder is enhanced without using a high frequency generator.

Advantageously, the invention provides a linear motor drive system using a linear optical encoder with high detecting accuracy and which allows the position detecting resolution of the encoder to be enhanced without using a high frequency clock generator.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A linear motor drive system for detecting movement of a slider of a linear pulse motor by an optical encoder and for feedback controlling said linear pulse motor on basis of a sensor signal; said system comprising:

a scale plate whose position is fixed and on which a plurality of rows of slits arrayed in a same direction as direction of an array of teeth of a stator and with a same pitch as that of said teeth of said stator;

a sliding block connected to said slider of said linear pulse motor and sliding together therewith;

a light source mounted on said sliding block for irradiating light on said plurality of rows of slits;

a photodiode array comprising a plurality of photodiodes mounted on said sliding block and disposed facing said light source with said scale plate interposed therebetween and arrayed with one pitch of said slits;

each of said photodiodes extending over said plurality of rows of slits and detecting light passed through said plurality of rows of slits; and a signal processing means for generating a feedback signal for feedback control of said linear pulse motor based light sensor signal from said photodiode array.

2. The system of claim 1, further comprising a diffuser disposed between said light source and said scale plate for smoothing distribution of light from said light source.

3. The system of claim 1, wherein n photodiodes are provided within one pitch of said slits, a width of one photodiode in the direction of the array is $P_o/(n+1)$, wherein $P_o$ is the pitch of a slit, and n is an integer, and a width of a gap between said photodiodes is $p_o/n(n+1)$.

4. A linear motor drive system for detecting a position of a slider of a linear pulse motor by an encoder and for feedback control of a position of said slider on basis of a sensor signal, said system comprising:

said encoder comprising a phase modulating encoder for outputting a phase modulated signal whose phase is modulated with movement of said slider;

a phase difference counter for counting phase difference between said phase modulated signal and a reference signal whose phase is not modulated for a fixed period;

dither signal generating means for generating a dither signal whose period is n times a measurement period of said phase difference counter and whose amplitude is a level causing a fluctuation of the phase of the phase modulated signal within a range of about the detecting resolution of said phase difference counter;

adder means for adding said dither signal to said phase modulated signal; and position detecting means for finding an average value of n measured values measured by said phase difference counter across n times of measurement period when said slider is positioned.

* * * * *